United States Patent [19]
Johansson et al.

[11] Patent Number: 5,193,594
[45] Date of Patent: Mar. 16, 1993

[54] ARRANGEMENT FOR INJECTING ADDITIVES

[75] Inventors: Leif A. Johansson, Solentuna, Sweden; Tom M. Jacobsen, Oslo, Norway

[73] Assignee: Norapp-Jon H. Andresen, Oslo, Norway

[21] Appl. No.: 864,055

[22] Filed: Apr. 6, 1992

Related U.S. Application Data

[62] Division of Ser. No. 648,831, Jan. 31, 1991, Pat. No. 5,133,391.

[30] Foreign Application Priority Data

Oct. 22, 1990 [NO] Norway .................................. 904544

[51] Int. Cl.$^5$ ............................................... B65B 1/30
[52] U.S. Cl. ..................................... 141/83; 366/132; 222/145; 141/103; 141/104
[58] Field of Search .................... 141/9, 100, 102, 104, 141/105, 83; 222/145, 59, 56, 77, 57, 59; 366/132

[56] References Cited

U.S. PATENT DOCUMENTS

| | | | |
|---|---|---|---|
| 3,227,196 | 1/1966 | Meehan | 141/9 |
| 4,183,384 | 1/1980 | Ervin et al. | 141/9 |
| 4,469,146 | 9/1984 | Campbell et al. | 141/9 |
| 4,513,796 | 4/1985 | Miller et al. | 141/83 |
| 4,886,367 | 12/1989 | Bragg et al. | 366/132 |
| 4,915,160 | 4/1990 | Reynolds | 366/132 X |
| 4,918,659 | 4/1990 | Bragg et al. | 366/132 |
| 5,018,645 | 5/1991 | Zinsmeyer | 222/145 X |
| 5,040,699 | 8/1991 | Gangemi | 141/104 X |

FOREIGN PATENT DOCUMENTS

| | | |
|---|---|---|
| 147210 | 11/1982 | Norway . |
| 1386998 | 3/1975 | United Kingdom . |
| 1404498 | 8/1975 | United Kingdom . |
| 1438164 | 6/1976 | United Kingdom . |
| 1474019 | 5/1977 | United Kingdom . |
| 1513520 | 6/1978 | United Kingdom . |

Primary Examiner—Ernest G. Cusick
Attorney, Agent, or Firm—Jacobson, Price, Holman & Stern

[57] ABSTRACT

A method and an apparatus for measured injection of additives into oil products and the like, in particular aims at the filling of fuel in tank farms for transport by tank trucks. Each batch of fuel shall have a pre-set proportion of additive. After each terminated filling and successively at a number larger than one, there is recorded a signal (S6) which represents discrepancies between actually supplied amount of additive and the amount which corresponds to the pre-set proportion. From the first signal (S6) there is calculated a further signal (S7) which represents discrepancies throughout said number of fillings and this further signal serves as a reference or correction value during the subsequent filling operation. A particular supply conduit (10) for fuel is adapted to give a through flow of fuel in order to remove remaining amounts of additive from the measuring system itself. The object is to obtain a substantially improved accuracy in injected proportion of additive in a batch of fuel being loaded or unloaded, and to avoid intermixing of different additives.

7 Claims, 4 Drawing Sheets

ARRANGEMENT FOR INJECTING ADDITIVES

This is a divisional of application Ser. No. 07/648,831 filed Jan. 31, 1991.

BACKGROUND OF THE INVENTION

This invention relates to a method and an arrangement for injecting additives in oil products and the like during successive, separate loading or unloading operations on tank farms, in particular for filling of fuel to be transported by tank trucks.

On tank farms where fuel is filled for transportation with tank trucks there is blended into each batch or load additives to the main part of the tank contents, which may be an oil product such as gasoline or diesel oil. There is often the question of a specific additive prescribed by the various oil companies to which fuel is delivered from the tank farm concerned. It is very important to obtain an accurate dosage of additives to each individual batch, and this represents a great measuring and regulating problem, in particular because it is desired to stop the injection of additive before the outflow of the main product (the oil product) terminates. This is important in order to avoid unintentional transfer of remainders of additive from a preceeding batch for one tank truck to another batch in the next tank truck to be filled.

Previously there are known various methods for measured blending of two liquids, for example regulation of two constituents in connection with filling from regular gasoline pumps at gas stations. Examples of known solutions for such purposes are to be found in Norwegian patent No. 147.210 and British patents Nos. 1.438.164 and 1.474.019. These known methods take as a basis a first low octane type of gasoline and a second, high octane type of gasoline respecively. These are blended in various pre-determined ratios in order to obtain intermediate octane values. However, the known methods are not directed to the specific problem which the present invention aims at, namely correction of an inaccuracy or error incurred during a preceeding filling on a tank farm, for obtaining a more accurate blending ratio in a subsequent filling operation.

SUMMARY OF THE INVENTION

The solutions to be described in the following make possible the dosage of different additives in a very accurate manner by means of a method based on electronic circuits which suitably can incorporate micro-processors or the like with accompanying software, and mechanical components. The system makes it possible to clearly distinguish between different additives, i.e. there is a complete control with respect to which additive is injected at any time into the main product, namely the oil product mentioned. Finally it is important that the invention makes it possible to clean all conduits to such a degree that any intermingling of different additives prescribed for example by different oil companies, will be essentially avoided in practice.

Thus on the one hand the invention relates to a method for the accurate dosage of such additives, comprising a particular form of correction or adjustment which can be regarded as an adaptive or self-learning method.

On the other hand the invention relates to an arrangement for the injection of additives, comprising a particular supply of the actual oil product under the control of a control unit so as to remove remaining small amounts of an additive in the dosing system, before a subsequent filling operation is initiated, where another additive is to be used for the batch concerned, for example in the next tank truck to be filled.

There is here the question of two essentially different solutions which however, in practice can be combined with advantage for the purpose of obtaining optimal functions and a maximum of accuracy when dispensing oil products including additives to tank trucks on tank farms.

This invention in a first aspect provides a method for measured injection of additives into oil products and the like during successive and separate loading or unloading operations in tank farms, in particular for filling fuel to be transported by tank trucks, whereby the injection of additive is terminated before the discharge of the oil product stops in the current loading or unloading operation, and whereby a pre-set proportion of additive is to be injected into the desired batch of oil product in the loading or unloading operation concerned, comprising providing a first signal representing a measure of accumulated amount of oil product during the current loading or unloading operation, providing a second signal representing a measure of accumulated amount of additive during the current loading or unloading operation, calculation of a third signal representing an amount of additive which should correspond to the preset proportion as represented by a fourth signal, comparing the third signal with the second signal so as to produce a fifth signal, and regulating the injection of additive in response to the fifth signal. The main specific and novel features of the method according to the invention consist therein that successively after each terminated loading or unloading operation a sixth signal is recorded in a number larger than one, said sixth signal representing possible discrepancies between actually injected amount of additive and the amount which corresponds to the pre-set proportion, that the recorded number of sixth signals is taken as the basis for calculating a seventh signal being representative of discrepancies occurring throughout said number of operations, and that the seventh signal is utilised for setting a reference or correction value for the second signal during a subsequent loading or unloading operation.

The invention also provides an apparatus for carrying out the method as stated above, for measured injection of additives to oil products and the like during successive and separate loading or unloading operations in tank farms, in particular for filling fuel to be transported by tank trucks, whereby the injection of additive is terminated before the discharge of the oil product stops in the current loading or unloading operation, and whereby a pre-set proportion of additive is to be injected into the desired batch of oil products in the loading or unloading operation concerned, comprising means for providing a first signal representing a measure of accumulated amount of oil product during the current loading or unloading operation, means for providing a second signal representing a measure of accumulated amount of additive during the current loading or unloading operation, means for calculating a third signal representing an amount of additive which should correspond to the preset proportion as represented by a fourth signal means for comparing the third signal with the second signal so as to produce a fifth signal, and means regulating the injection of additive in response to the fifth signal. The novel and specific features of the apparatus according to the invention comprise:

means for successively recording a sixth signal in a number larger than one after each terminated loading or unloading operation, said sixth signal representing possible discrepancies between actually injected amount of additive and the amount corresponding to the pre-set proportion, means for calculating a seventh signal from the recorded number of sixth signals, said seventh signal being representative of discrepancies occurring throughout said number of operations, and means for setting a reference or correction value for the second signal during a subsequent loading or unloading operation, on the basis of said seventh signal.

Moreover, in a second aspect this invention provides an arrangement for measured injection of additives in oil products and the like during successive and separate loading or unloading operations in tank farms, in particular for filling fuel to be transported by tank trucks, comprising at least two supply conduits for additives and each provided with a shut-off valve and interconnected upstream of a common control valve with a subsequent common conduit for additives leading to a main conduit for oil products and the like, the novelty of this arrangement consisting essentially therein that a particular supply conduit for said oil products and the like is adapted to be temporarily put into fluid connection with a point of the common conduit oppositely with respect to the connection thereof to the main conduit, and that a control unit by means of one or more valves establishes said fluid connection during a time interval which starts substantially simultaneously with or after closing of a shut-off valve for terminating an injection of additive before fulfilling a loading or unloading operation. Further specific features according to the invention are stated in the accompanying claims.

BRIEF DESCRIPTION OF THE DRAWINGS

In the following description the invention will be explained more closely with reference to the drawings, in which.

DESCRIPTION OF PREFERRED EMBODIMENTS

Figure 1:
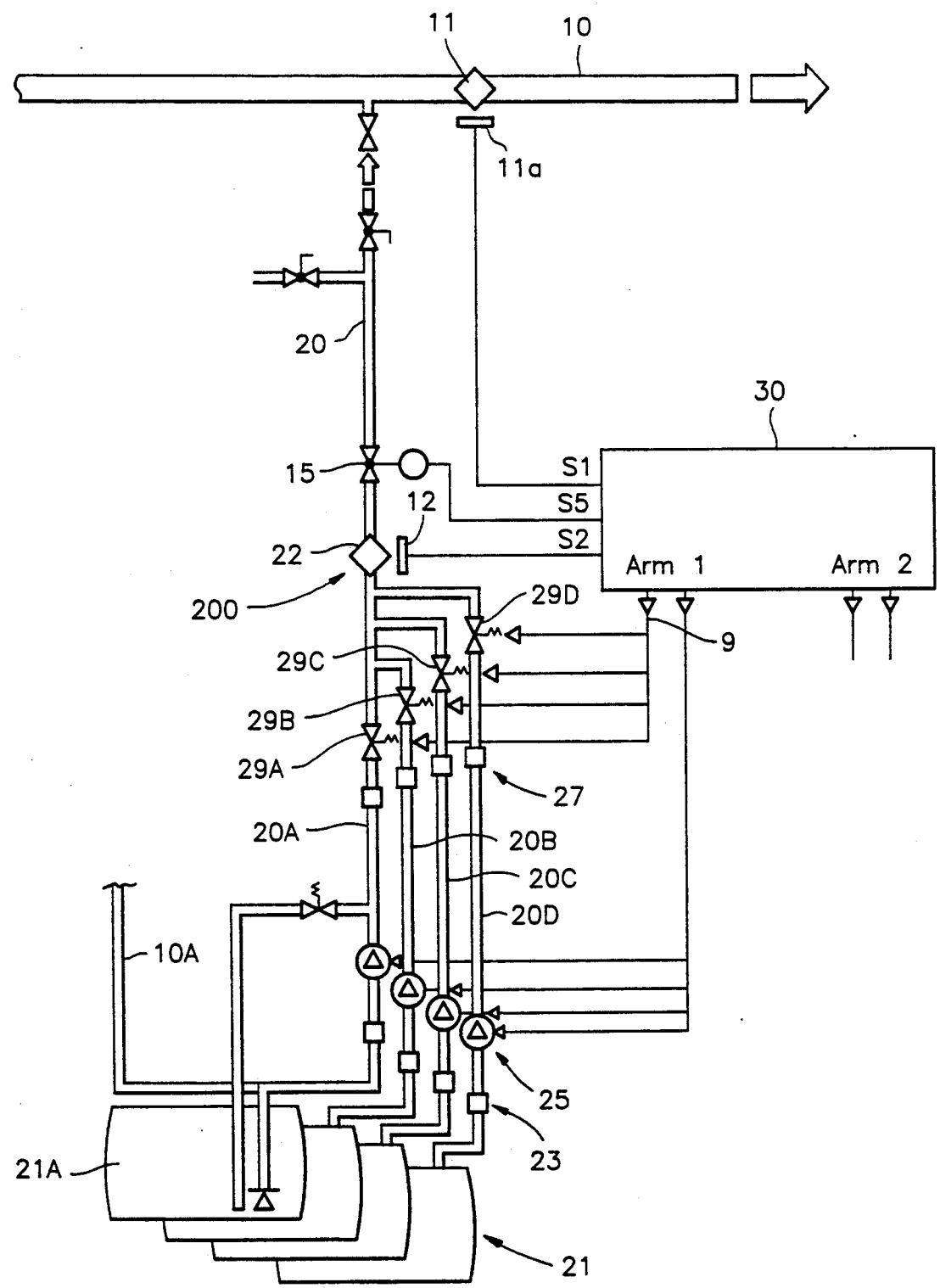
FIG. 1 is a schematic overview of a tank filling system comprising an arrangement for the measured injection of additives as well as a control and regulating unit included therein.

In FIG. 1 there is shown a section of a main conduit 10 for an oil product in a tank farm, in which the main conduit is extended to a dispensing point, for example for filling tank trucks. In the main conduit 10 there is shown a measuring device 11 which serves to measure the total quantity of product which flows through the conduit. The signal from an electronic circuit 11a integrated with the measuring device 11 can be suitably in the form of pulses S1 which are lead to a control and regulating unit 30. This unit can perform all control and regulation functions in the system of FIG. 1. In addition to the functions being of interest in connection with the present invention as it is to be explained in the following description, the unit 30 can also carry out several other more or less subordinate functions, including alarm functions.

For injecting additives into the main flow of a product in the conduit 10 there is provided a common conduit 20 in which there is inserted a motor-driven regulating valve 15 and upstream thereof a measuring device 22 for the supplied quantity of additive. Corresponding measurement pulses S2 are applied to the unit 30. From this unit there is delivered a signal S5 which is preferrably also a pulse signal, to the regulating valve 15 for setting this valve.

In the example on FIG. 1 there is a possibility of injecting four different additives from respective tanks 21 through a separate conduit 20A, 20B, 20C and 20D respectively. In these supply conduits there are provided pumps 25 as well as filters 23 and 27. For selection of additive in connection with each individual batch of the product to be filled through the main conduit 10, the supply conduits are provided with respective solenoid valves 29A-D, these being controlled by means of respective signals S9 from the unit 30. Similar control signals from this unit are also applied to the pumps 25. In addition to the system shown in FIG. 1 for one dispensing point (Arm 1), the control and regulating unit 30 can also provide for corresponding regulation and control for one or more further dispensing points. (e.g. Arm 2).

The supply conduits 20A-D for additives are brought together at a location or point 200 where there is a transition to the common conduit 20, i.e. upstream of the measuring device 22 and accordingly also upstream of the regulating valve 15. For the intended function and accuracy it is significant that the solenoid valves 29A-D are located adjacent to the junction point 200.

In FIG. 1 there are also shown various valves and connections which are quite subordinate in connection with the present invention, and such components do not need any detailed explanation here. It is to be mentioned however that a modification is indicated at the lower end of supply conduit 20A for additive from the tank 21A. This relates to an alternative connection of this supply conduit to a particular conduit 10A adapted to supply a flow of the main product. This particular conduit 10A can for example be branched off from the main conduit 10 upstream of the joint between this and the common conduit 20. Therefore in this modification the supply conduit 20A will no longer be employed for additive (from tank 21A) but for a specific function which is to be described below. This has to do with the second aspect of this invention being mentioned in the introductory portion of this description.

As already mentioned a main object of the system and the control according to FIG. 1 in this connection is considered to be an accurate dosage of one or more possible additives (here four alternatives) to a main flow of an oil product, whereby injection of additive is stopped before the discharge of the oil product terminates during a current loading or unloading operation. A pre-set proportion of additive is to be supplied to the desired batch of the product to which the operation relates. Besides, it is significant here that the quantity of additive generally constitutes a very small proportion of the total quantity of the dispensed product through the main conduit 10.

Figure 2:
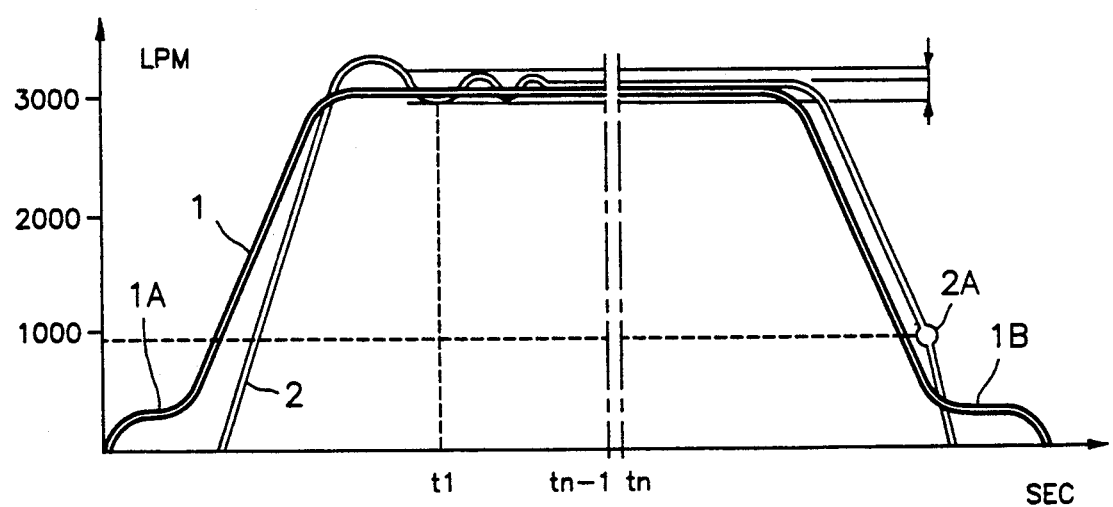
FIG. 2 is a diagram showing curves which illustrate a typical filling and blending process as a function of time.

In the diagram of FIG. 2 a curve 1 shows a typical variation of the flow (e.g. in liters per minute—LPM) of the main product as measured for example by the measuring device 11 in the main conduit 10, and curve 2 in a corresponding manner shows the flow of an additive, as for example measured by means of the measuring device 22. The horizontal axis represents time in seconds, whereas the vertical axis should actually be considered to include two different scales, i.e. one for the large main flow (curve 1) and another for the much smaller flow quantity of additive (curve 2).

It is seen from the diagram that the main product flow first starts and increases towards a more or less constant value which is maintained during the major part of the filling operation concerned. Somewhat later the injection of additive is started and this has certain initial oscillations as a result of the regulation by means of functions incorporated in unit 30. The largest initial excursions can be considered to be decayed at the time t1 before the flow of additive is regulated to a relatively constant value which is maintained during the major part of the filling operation. During this major part of the operation regulation of the supply of additive is performed according to generally known regulating principles, aiming at a maximum of accuracy in the quantity of additive in compliance with a pre-set proportion thereof. In a regulating system based on pulse signals as discussed with reference to FIG. 1, this is effected by accumulating pulses which represent the total dispensed volume of the product (signal S1), and supplied quantity of additive (signal S2) respectively, during the operation concerned. The resulting dispensed batch, e.g. to a tank truck, accordingly in each case shall have a maximum of accuracy in the proportion of the additive being prescribed for the batch.

Considering again the diagram of FIG. 2, it will be seen that the areas between both curves 1 and 2 represent non-balance or discrepancy from the intended proportion of additive in the product batch concerned. During that part of the filling time when both curves run horizontally and in parallel, the actual proportion of additive in the product volume dispensed thus far, may be regarded as quite exactly measured.

Particularly at the terminating phase of the filling operation however, some irregularities occur which primarily are due to the fact that the supply of additive is stopped somewhat before the main product flow ceases. Closing of the supply of additive is effected at the point 2A in FIG. 2. Whereas the reduction of the main flow and the flow of additive until this point has been more or less parallel, the main flow then continues with a terminating volume represented by the curve portion 1B which in this example has a shape similar to the initial curve shape 1A relating to the main product flow. These curve portions or shapes can be determined inter alia by valve characteristics and pump characteristics in the system.

As mentioned above the terminating flow volume 1B of the main product has also the function of flushing the main conduit 10 so that remainders of additive will not be left therein after termination of the filling of a batch of fuel. What is important in this connection is that the terminating quantity of main product may vary considerably depending upon various factors, inter alia characteristics as mentioned. In particular such variations may be time-dependent, i.e. as batch after batch is filled into different tank trucks during a workday at a tank farm.

Figure 3:
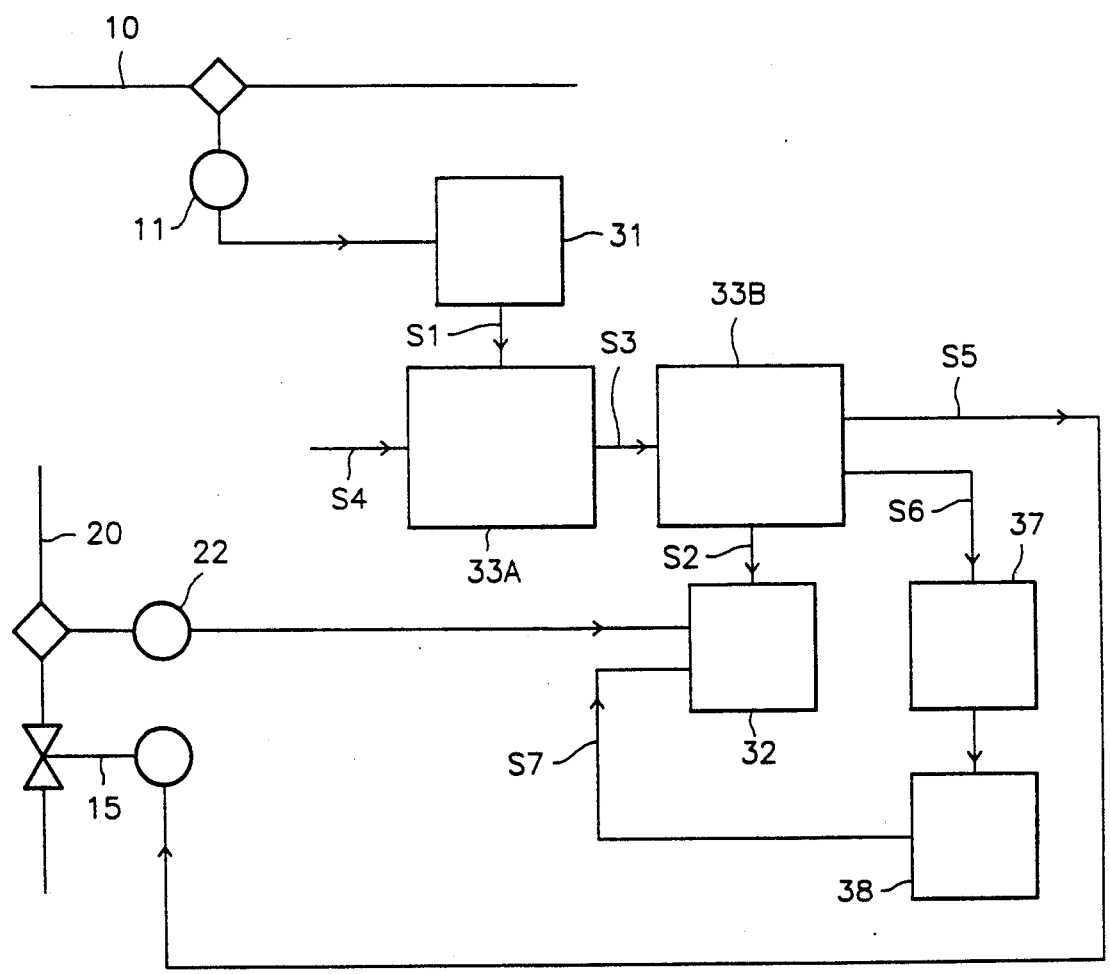
FIG. 3 shows an example of a simplified block diagram for regulation in the system of FIG. 1.

FIG. 3 shows a block diagram over a control system which according to the invention is aimed at eliminating as far as possible inaccuracies in the injected quantity of additive in each batch of the product dispensed, as a consequence of the above and other sources of inaccuracy, but mainly being due to the initiation and particularly the termination of the filling operation.

In the block diagram of FIG. 3 the main conduit 10 is seen as well as the measuring device 11 and the common conduit 20 with the associated regulating valve 15 and measuring device 22 for the supply of additive, corresponding to the overview of FIG. 1. The other blocks in the diagram of FIG. 3 represent various functions or steps in the signal processing which are involved in the method according to the invention.

Measurement pulses or signals from the measuring device 11 are fed to an accumulator or register circuit 31 which delivers a first signal S1 to a calculating block 33A. To this block there is also applied a signal S4 representing the above mentioned pre-set proportion of the additive concerned in the current filling operation. On the basis of these two signals block 33A performs a calculation of a third signal S3 which is a measure of the quantity of additive which should correspond to the pre-set proportion represented by the signal S4. The third signal S3 is applied to a further functional block 33B which in practice can be regarded as integrated with the function of block 33A, and which provides for a comparison with still another signal S2. This signal S2 is derived from the measuring device 22 via an accumulator circuit 32 of similar kind as the circuit 31, and this second signal therefore is a measure of accumulated quantity of supplied additive during the current loading or unloading operation. The result of the comparison in block 33B is inter alia a fifth signal S5 which is applied to the regulating valve 15 and thereby serves to control the injection of additive. Thus far the function of the blocks in FIG. 3 can be considered to correspond in principle to a previously known form of regulating loop.

From block 33B there is also shown an output signal S6, and this represents any discrepancies between actually supplied quantity of additive and the quantity which corresponds to the pre-set proportion. These latter quantities are involved in the form of the signals S2 and S3 as mentioned above. After each terminated loading or unloading operation the sixth signal S6 is registered in a particular register 37 which is adapted to register a number of such signals S6, preferably a number of such signal registrations being substantially higher than one, e.g. five such signals S6, but preferrably at least 10 signals S6 from successive filling operations. A calculating unit 38 associated with the error register 37 serves to calculate a further signal S7, e.g. as an average value of the registered signal values S6, the signal S7 serving to set a reference or correction value in the accumulator circuit 32 in relation to the second signal S2 discussed above. This reference or correction is effective during the subsequent loading or unloading operation so as to give an increased accuracy in the supply of additive. This means that the system is self-learning and takes into account errors registered during a number of preceeding filling operations, as a basis for correction.

In the preferred embodiment based on pulse signals, the accumulator or register circuit 32 will be counted up or down depending upon the applied correction signal S7, which is calculated on the basis of the registered number of error signals S6. In other words the signal S7 will influence the accumulator circuit 32 to require a larger or smaller number of signal pulses from the measuring device 22 in order to obtain the intended proportion of additive in comparison with the pre-set proportion (signal S4).

It is obvious that the calculation of the signal S7 in block 38 may be based on other formulas or algorithms than an average calculation as mentioned, for example in order to take into account any occuring clear tendencies in the development of errors or discrepancies throughout a preceeding number of filling operations which the error register 37 is adapted to handle. Advantageously this register can have quite a significant number of storage locations, e.g. ten storage locations for a corresponding number of signals S6.

Reference is now again made to FIG. 1 and the modification represented by the particular supply conduit 10A for a main product flow. By the connection thereof to the conduit 20A at the same time as the connection thereof to tank 21A is broken, there is obtained a modification which in many cases has substantial significance in such systems, and which in principle has also interest in situations where the above discussed accurate dosage can take place in other ways. With this modification the system of FIG. 1 will involve the possibility of selecting only between three different additives, namely through the respective supply conduits 20B, 20C and 20D extending each from a separate tank 21.

For the particular purpose stated here the unit 30 is adapted to open the cut-off valve 29A during a time interval starting approximately simultaneously with or after the closing of one of the solenoid valves 29B-D for terminating the injection of the additive before the completion of a loading or unloading operation. Thereby the common conduit 20 with associated measuring device and valves in the conduit section from the junction point 200 mentioned and up to the main conduit 10, will be neutralized with respect to remaining additive, i.e. this will be replaced by a volume of the main product supplied through the particular supply conduit 10A.

The time interval allocated for this through flow of the main product from the conduit 10A to the main conduit 10 through the common conduit 20, advantageously can correspond to the time taken for closing the common regulating valve 15 at the termination of an injection of additive. During this time interval the transfer or accumulation of measuring pulses S2 from the measuring device 22 must be blocked or inactivated. Then the accuracy of the measurements of additive will not be unfavourably influenced during the supply of main product through the conduits 10A, 20A and 20. For example the time interval mentioned here may be 10 seconds.

Figure 4:
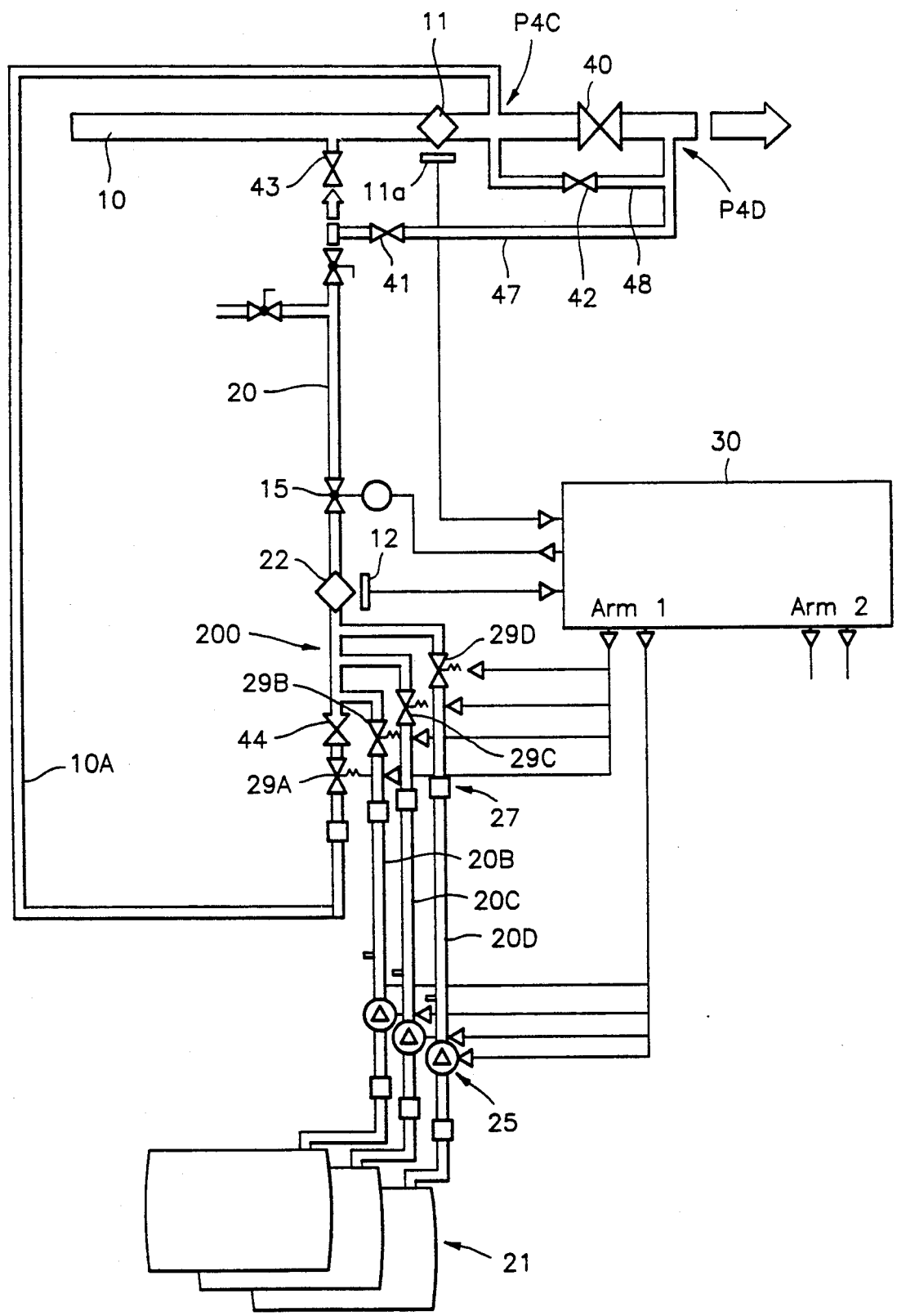
FIG. 4 shows a schematic overview similar to FIG. 1, but with more detailed indications of conduits and valves for the above mentioned particular supply of oil product for removing additives from the dosing system.

The just mentioned modification of the arrangement of FIG. 1, in a favourable practical embodiment can be designed as shown in FIG. 4. This overview figure has the same main components and functions as the system in FIG. 1 as far as main conduit 10, common conduit 20 and control unit 30 are concerned, and also including three tanks 21 for different additives.

The particular supply conduit 10A is here connected to the main conduit 10 at a point P4C lying upstream of a main valve 40 in the main conduit. The connection of the common conduit 20 to the main conduit takes place through a check valve 43, which is preferrably located closely adjacent to the main conduit 10. A corresponding check-valve is also shown in FIG. 1

From a point at the common conduit 20 adjacent to the check valve 43 there is branched off a first by-pass conduit 47 with an accompanying valve 41, extending to a point P4D downstream of the main valve 40. Between the first point P4C and the second point P4D at the main conduit 10 there is moreover shown a parallel second by-pass 48 having an associated valve 42. This second by-pass conduit 48 with its valve serves inter alia to establish an adjustable pressure drop across the main valve 40 when this is closed. It may also be possible to establish the pressure drop by quite simply closing the main valve completely or partially.

This pressure drop brings about a through-flow of the main product from the main conduit 10 through the particular supply conduit 10A and the valve 29A when this is open, and further through the common conduit 20 and the first by-pass conduit 47 (with open valve 41) back to the main conduit 10 in the point P4D. The established pressure difference P4C-P4D therefore makes it superfluous to have any particular pump for this through-flow, which serves to flush through the common conduit 20 with associated valves, measuring device and so forth for additive after terminated supply of additive from one of the tanks 21 through respective supply conduits 20B, 20C and 20D. In addition to the check-valve 43 mentioned also another check-valve 44 will be required upstream of the junction point 200 in the common conduit 20.

Due to servomechanical considerations the measuring device 22 should work against a controlled counter pressure and is therefore located upstream of the regulating valve 15. During the through-flow or flushing process discussed here the control unit 30 will place the measuring device 22 out of operation and there may be provided for a correction of the quantity of additive which exists between the junction point 200 and the main conduit 10, i.e. the point in front of the check valve 43, by incorporating a corresponding magnitude as a parameter in the control unit 30 in order to be taken into account when calculating the quantity or proportion of additive for each batch of product.

In view of the function of the check valve 44 in FIG. 4, the valve 29A shown (and the filter in front of it) are actually unnecessary in the system. This will appear from the following explanation of the procedure and the establishing of flow paths at the termination of a filling operation: The main valve 40 is closed by a signal received from a main system separate from the control unit 30. The bypass valve 42 remains open. At the time 2A in FIG. 2 the control unit 30 sends a closing signal to one of the valves 29B-D and a corresponding or co-ordinated signal opens the valve 41. Thereby the pressure at the outlet end of the common conduit 20 falls towards a pressure corresponding to that prevailing at the point P4D. The pressure difference closes the check valve 43 between the main conduit 10 and the common conduit 20, but also opens check valve 44 between the particular supply conduit 10A and the common conduit 20. This situation develops as a result of the pressures at points P4C and P4D being different, i.e. because of the pressure drop across valve 42. When valve 42, which can also be described as a function of the main valve 40, is closed by a signal which can be applied from an exterior system (e.g. the main system) the through-flow will be at its maximum. The valve 41 can be closed by a signal from the control unit 30 before or later than valve 42, or it can be closed by the same as, or a co-ordinated signal to the one which closes valve 42. It is practical to adjust the procedure described here and the resulting flow quantities such that the main conduit 10 will be flushed all the way to the outlet or dispensing point.

In this connection it is of significance that valve 41 is maintained open during a time interval corresponding approximately to the time it takes to close the regulating valve 15. As illustrated in FIG. 2 this time (from point 2A) is shorter than the time required for terminating the main flow represented by the curve portion 1B in FIG. 2.

It is obvious that the method as well as the arrangement described here can be modified in various ways in relation to what is shown and explained. Thus it is obvious that the number of various additives can deviate from what is shown as examples, i.e. four in FIG. 1 (four tanks 21), and three possible additives in FIG. 4.

We claim:

1. Apparatus for measured injection of additives in oil products and the like during successive and separate loading or unloading operations in tank farms, in particular for filling fuel to be transported by tank trucks, comprising:

at least two supply conduits (20B-D) for additives and each provided with a shut-off valve (29B-D), said at least two supply conduits (20B-D) being interconnected (200);

a common control valve (15) connected downstream from said at least two supply conduits (20B-D);

a subsequent common conduit (20) for additives, said subsequent common conduit (20) being connected to said common control valve (15) downstream from said common control valve (15);

a main conduit (10) for oil products and the like, said main conduit being connected downstream of said subsequent common conduit (20);

a connection (43) for connecting the main conduit (10) to the subsequent common conduit (20);

an additional supply conduit (10A) for said oil products and the like, said additional supply conduit (10A) being adapted to be temporarily put into fluid connection with a point of the common conduit (20) oppositely with respect to the connection (43) thereof to the main conduit (10); and a control unit (30) which by means of one or more valves (29A, 41) establishes said fluid connection during a time interval which starts substantially simultaneously with or after closing of at least one of said shut-off valves (29B-D) for terminating an injection of additive before fulfilling a loading or unloading operation.

2. Apparatus according to claim 1, and further comprising a main valve (40) in the main conduit (10), a first by-pass conduit (47), an intermediate check valve located in the connection (43) and directed toward the main conduit (10), a second by-pass conduit (48), and a by-pass valve (42) in the second by-pass conduit (48), wherein said additional supply conduit (10A) exits the main conduit (10) upstream of the main valve (40) therein, and the first by-pass conduit (47) exits the common conduit (20) adjacent to the main conduit to connect with the main conduit (10) downstream of the main valve (40), said second by-pass conduit (48) being arranged in parallel to the main valve (40) so as to establish an adjustable pressure drop across the main valve when the main valve is closed.

3. Apparatus according to claim 2, and further comprising a measuring device (11) for measuring the total flow in the main conduit (10), said measuring device being positioned along the main conduit (10) upstream from the additional supply conduit (10A).

4. Apparatus according to claim 2, and further comprising an additional measuring device (22) for measuring injected amount of additive in the common conduit (20), said additional measuring device (22) being adapted to be controlled by the control unit (30) to be inactivated during said time interval.

5. Apparatus according to claim 4 wherein said additional measuring device (22) for measuring injected amount of additive is located upstream of the control valve (15) in the common conduit (20).

6. Apparatus according to claim 2, and further comprising an additional by-pass valve (41) located in the first by-pass conduit (47), wherein the control unit (30) is adapted to open the additional by-pass valve (41) in said fluid connection when the main valve (40) is closed, during said time interval, said time interval substantially coinciding with the time it takes to close the control valve.

7. Apparatus according to claim 1, wherein the control unit (30) is adapted to perform a correction for the remaining amount of additive being present between said at least two supply conduits (20B-D) at the upstream end of the common conduit (20) and the main conduit (10).

* * * * *